INVENTORS
John M. Webb
Eldor R. Herrmann
BY McCoy, Greene, Medert
& De Grotenhuis
ATTORNEYS

# United States Patent Office 3,465,420
Patented Sept. 9, 1969

3,465,420
CERAMIC CRACK SEALER
John M. Webb, Chagrin Falls, and Eldor R. Herrmann, Cleveland Heights, Ohio, assignors to Edward J. Mellen, Jr., East Cleveland, Ohio
Filed June 9, 1965, Ser. No. 462,677
Int. Cl. B22d 19/10; B23k 31/02; B23p 7/00
U.S. Cl. 29—490                                            14 Claims

ABSTRACT OF THE DISCLOSURE

Automobile body panels having lapped welded joints sealed by a process comprising applying at the entrance to the welded joint a narrow strip of a pasty ceramic composition containing 15 to 50 percent by weight of a water-soluble silica-containing binder, such as an alkali-metal silicate, and 50 to 85 percent by weight of refractory particles, heating the strip to harden it and seal the entrance to the joint, applying an acid flux to the heated joint, thereafter heating the entrance to a temperature of 400° to 1200° F., and applying a solder to provide an outer surface flush with the outer surfaces of the welded panels.

---

The present invention relates to the covering of sheet metal joints or seams and more particularly to a process for protecting a metal joint against corrosion when such joint is heated to a high temperature and covered with solder or other low melting alloy prior to painting.

Heretofore, the welded seams of automobile bodies have been covered with solder prior to painting to conceal the joints or seams and improve the appearance, but such procedures have accelerated the corrosion of the metal at such seams because the strong fluxes or chemical cleaning agents to prepare the metal for soldering often remain trapped between the contacting metal sheets.

The present invention solves the problem in a simple manner which is economically feasible and does not require a substantial change in the soldering procedures. A ceramic composition is provided which can be easily applied as a narrow strip to cover the crack at the entrance to the weld, which will adhere strongly to the metal, and which will provide an effective seal when heated to a temperature of 1200° F. Surprisingly, all of these properties can be provided at low cost by providing a simple heat-hardenable ceramic composition containing finely divided ceramic material and a low cost silica-type binder, such as an alkali-metal silicate.

The vehicle body or other sheet metal article made according to this invention, preferably is shaped to provide a narrow solder-receiving depression or channel at the welded or riveted seam between the flush outer surfaces of the connected metal sheets or panels. The heat-hardenable ceramic composition of this invention is applied in such depression as a narrow strip to the entrance to the crack between the sheets and is hardened by heating to bond the ceramic material to the metal and to seal the crack. Thereafter the acid flux or other liquid cleaning agent may be applied in the depression to prepare the surfaces for soldering or brazing without danger of leaking between the metal sheets towards the welds or other attaching means of the joint.

An object of the invention is to prepare a metal joint for soldering without reducing its resistance to corrosion.

A further object of the invention is to improve the corrosion resistance of solder-covered metal joints without unduly increasing the cost.

Another object of the invention is to provide an inexpensive seal for metal joints which adheres to the metal and remains effective when heated to soldering temperatures.

A still further object of the invention is to provide a simple inexpensive process for soldering the metal joints of new or used automobile bodies which does not require substantial change in existing procedures.

These and other objects, uses and advantages of the invention will become apparent to those skilled in the art from the following description and claims and from the drawings in which:

It will be understood that the process of this invention can be used to effect sealing of many different types of metal joints in addition to the more common welded, brazed or riveted joints used on vehicle bodies. The drawings show some of the simpler welded joints for which the process of the present invention is particularly well suited, such joints having a depression or channel to simplify the soldering or brazing operation and to facilitate finishing of the surfaces.

Figure 1:
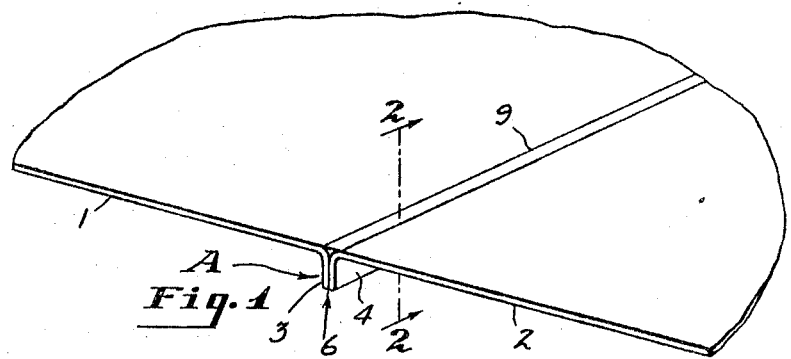
FIGURE 1 is a fragmentary perspective view showing one form of soldered joint made according to the present invention.
Figure 2:
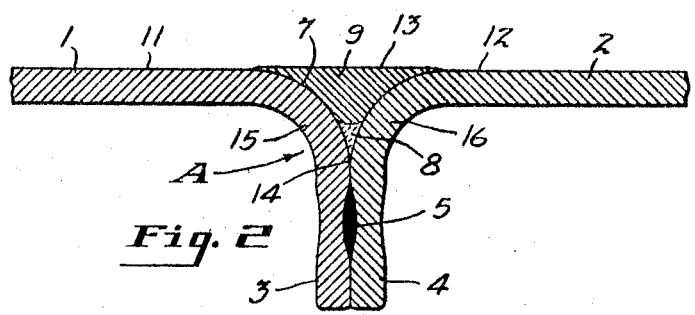
FIGURE 2 is a vertical sectional view taken substantially on the line 2—2 of FIGURE 1 and on a larger scale.

FIGURES 1 and 2 show a portion of an automobile body having a type of lapped joint A which is well suited for riveting as well as welding. The automobile body has a first sheet metal panel 1 rigidly connected to a second sheet metal panel 2 with the flanged side edge portions 3 and 4 of the panels held together by suitable resistance welds to provide a long straight seam 6. The welds of the joint A may be projection welds or seam welds but are shown herein as simple spot welds 5 which are closely spaced along the length of the seam 6. The panels define a straight upwardly facing channel 7 which gradually increases in width in a direction away from the crack entrance 14 where the rounded portions 15 and 16 of the two panels come together.

In order to prevent the flow of flux or cleaning liquid by capillary action through the entrance 14 into the crack between the flanges 3 and 4, which would expose the metal surfaces or promote corrosion between the flanges, a narrow strip 8 of a hardenable ceramic composition of pasty consistency is applied to the bottom of the channel or depression 7 to seal the crack entrance 14. Said strip may be extruded through a nozzle as in a caulking gun, for example, or may be applied by a roller, by pouring or by other methods. The width of the strip should be a small fraction of the width of the channel 7 so that a large uncoated metal surface is exposed for soldering. The ceramic material may be applied after heating the metal at the seam 6 or the metal may be heated after the ceramic is applied to cause the ceramic to set up and harden rapidly, but it can harden at room temperature. The hardened material adheres strongly to the metal and effectively seals the entrance to the crack at 14 even when the joint is heated to 1200° F. or higher.

After the strip 8 has hardened, an acid flux, such as zinc chloride, or other liquid cleaning agent is applied in the conventional manner to the channel 7 and any other surfaces to be soldered, preferably while the metal is very hot, to prepare the surfaces for soldering. Then the solder is applied to the surfaces while they are heated to a high temperature, such as 400° to 1200° F., preferably above the melting point of the solder, and additional solder is added until the channel 7 is completely filled above the strip 8 by a solder strip 9 having a volume which is preferably at least several times the volume of the ceramic strip 8. If desired, a conventional "tinning" operation may be performed before the bulk of the solder is applied, but this is not necessary. Also, the solder may be worked to provide a smooth flat outer surface in order to minimize grinding or other finishing operations. After the soldering operations are completed the outer surface 13 of the solder strip is smooth and flush with the smooth flat outer surfaces 11 and 12 of the panels 1 and 2 so that, after painting, the seam is concealed and the paint surface is smooth and continuous above the joint.

Figure 3:
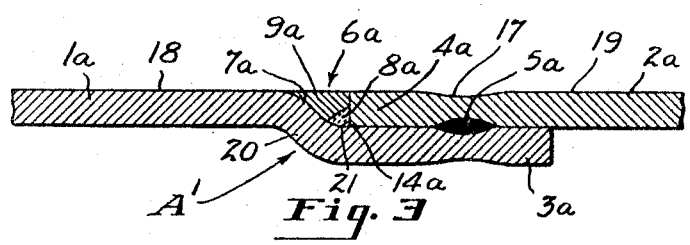
FIGURE 3 is a vertical sectional view similar to FIGURE 2 and showing a modified form of soldered joint.

FIGURE 3 shows a more common type of lapped joint A' where the sheet metal panels of the automobile body are overlapped to form a straight seam 6a. The first panel 1a has a flat offset side edge portion 3a connected to the main flat portion of the panel by an inclined portion 20 which forms a straight shoulder. The second panel 2a has a side edge portion 4a resting on the portion 3a with a straight side edge 21 adjacent the shoulder and spaced therefrom to provide a long straight narrow channel 7a, the flat outer surfaces 18 and 19 of the panels on opposite sides of such channel being flush with each other as in the construction of FIGURES 1 and 2. As herein shown, the overlapped side edge portions 3a and 4a of the joint A' are held together by closely spaced spot welds 5a. With this type of welding there may be surface indentations 17 formed by the welding heads which require grinding and/or soldering prior to the final painting of the outer surface.

In the automobile body construction of FIGURE 3 the panels 1a and 2a are generally the same size as the panels 1 and 2, but the side edge portions 3a and 4a are arranged so that the straight side edge 21 of one panel forms one side of the solder-receiving channel and the entrance 14a to the crack or clearance space between the panels is located at the bottom of said side edge. In this form of the invention the long narrow ceramic strip 8a is applied to the side edge 21 throughout the length of the seam 6a to seal the entrance to the crack at 14a. Such ceramic strip has a height substantially less than the depth of the channel 7a or the thickness of the side edge portion 4a so that the solder strip 9a filling the channel 7a will adhere to the top portion of the edge 21 and completely cover the strip 8a. The upper surface of the strip 9a may be ground smooth and flat and flush with the outer panel surfaces 18 and 19 prior to painting.

The procedure for filling the channel 7a is the same as described for the channel 7, and the ceramic composition may be the same. It is, however, more important to provide a composition which does not flow by the action of gravity after it is applied to the seam. A viscous ceramic material which tends to maintain its shape is desirable so that the width of the ceramic strip may be minimized and a maximum metal area is available for contact with the solder in the upper portion of the channel 7a. Of course, the ceramic strip must have some width to provide a good seal and to obtain good adhesion to the metal. Also, it is often desirable to cause some of the ceramic material to flow a small fraction of an inch into the crack at the entrance 14a, in which case the material must be of a consistency to permit this.

Figure 4:
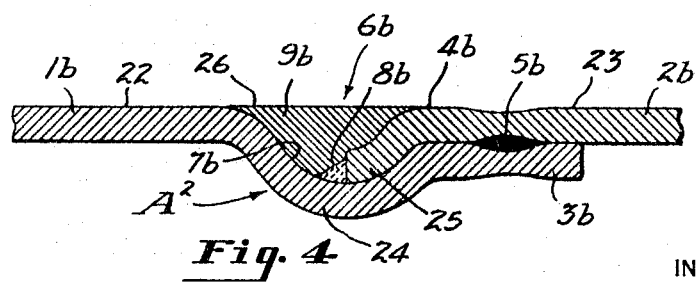
FIGURE 4 is a vertical sectional view showing a third form of joint made according to this invention.

The sheet metal panels may be shaped to provide a solder-receiving channel with a depth greater than the thickness of the panels as in the auto body of FIGURE 4. In that construction the first panel 1b has a long straight rounded channel 24 adjacent the offset side edge portion 3b, and the side edge portion 4b of the second sheet metal panel 2b has a rounded side portion 25 which fits the upper surface of the channel 24. The overlapped portions 3b and 4b are held together by the spot welds 5b of the straight seam 6 so that the smooth flat outer surfaces 22 and 23 of the panels are flush and the straight side edge of the panel 2b is parallel to the straight shoulder of the panel 1b which forms the side of the straight solder-receiving channel 7b. The ceramic strip 8b and the solder strip 9b of the lapped joint A² are applied substantially as in the joint A' except that the ceramic strip may cover the entire side edge of the panel 2b. The manner of application of the ceramic material is, therefore, less critical. Also, a ceramic material of somewhat lower viscosity can be employed.

The ceramic sealing composition used in the process of this invention hardens to provide an impermeable sealing strip adhered to the metal which comprises essentially finely divided ceramic material bound together by a gelled silicon binder, such as an alkyl silicate, an alkali metal silicate, colloidal silica, mixtures thereof, or the like. Such ceramic composition may contain the same type of gelling binders commonly used in making ceramic cores, refractory shell molds and other mold parts for investment casting and may contain other conventional ingredients such as boric acid, ammonium phosphate, polyvinyl acetate, polyvinyl alcohol, etc. but such ingredients are not essential.

The finely divided ceramic material used in the sealing composition may be any of the refractories commonly used for investment casting of metal parts and various other finely divided fibrous or comminuted heat resistant materials which do not burn, decompose or evaporate at the soldering temperature including quartz, zirconium silicate, aluminum silicate, zirconium, alumina, kaolin, silicon oxide, silicon carbide, graphite, flint, crushed firebrick grog, asbestos fibers, clay, etc. The particle size is not critical, but a major portion by weight of the ceramic particles is preferably small enough to pass through a sieve screen of 50 meshes to the inch and small enough to be retained by a screen of 400 meshes to the inch (standard Tyler sieve series). The largest particles of the composition preferably have a diameter no greater than one-fourth the width of the crack at the entrance 14 to be sealed by the composition so that the composition will flow a short distance into the crack. Thus, if the composition is used to seal cracks up to ⅛ inch wide, the maximum particle size is preferably about ½₃₂ inch. The composition preferably contains smaller particles in a sufficient amount to provide a pasty consistency so that the composition can be extruded through a nozzle or slot and applied like a caulking compound.

The ceramic particles are held together by a water-soluble silicate binder which serves as a vehicle for the ceramic sealing composition as it is extruded or otherwise applied and which thereafter hardens to form a solid silicious gel and to bond the ceramic strip to the metal surfaces. The soluble silica-containing binder is of the conventional type used in the investment casting art, and gellation may be effected as is well understood in that art. The soluble gelling binder employed in the ceramic sealing composition is either an alkyl silicate having preferably 1 to 12 carbon atoms, an alkali-metal silicate, colloidal silica, mixtures thereof, or the like, and the amount of such binder is preferably at least 15 percent and usually no more than 50 percent of the total weight of the binder plus the finely divided ceramic material. The preferred ceramic sealing composition is a paste containing a major portion by weight of the ceramic particles, about 15 to 50 percent by weight of said silicious binder, and less than 30 percent by weight of water.

The preferred binder and the one which gives best results is an alkali-metal silicate or water glass such as sodium silicate or potassium silicate. Good results are obtained using 15 to 50 percent by weight of an alkali metal silicate having the formula $M_2O x SiO_2$, where M is sodium, potassium or lithium and the molar ratio, $x$ is about 1.5 to 4, and 50 to 85 percent by weight of finely divided ceramic material. It will be apparent, however, that the desired results can be obtained with alkali-metal silicates of various silica contents. Also, the water content can vary considerably provided that the composition has the desired pasty consistency and will harden to provide the desired strength and adhesion to the metal surfaces. A small amount of water may be desirable for gellation and to reduce the viscosity somewhat, but too much water is undesirable because it can reduce the reliability and strength of the solid silicious gel and the strength of the adhesive bond to the metal. Generally, the amount of water is less than 30 percent of the total weight of the ceramic composition as originally mixed (i.e., about 5 to 20 percent). A typical ceramic composition consists of 50 to 85 percent by weight of refractory particles and/or other ceramic particles (such as kaolin), 15 to 40 percent by weight of sodium silicate, and up to 30 percent by weight of water. The composition may be heated after it is applied to speed up the evaporation of any excess water or to accelerate the gellation.

Although superior results are obtained using a sodium silicate solution or a water glass as the binder in the ceramic sealing composition, other silicate binders are also suitable to replace all or part of the sodium silicate. Good results are obtained using 15 to 50 percent by weight of a conventional colloidal silica or slilcic acid with 50 to 85 percent of the finely divided ceramic material. The colloidal silicate is used as a binder in the conventional manner with water as is well understood in the investment casting art. As sold commercially, this silicate is usually sold as an aqueous solution containing around 30 to 50 percent by weight of colloidal silica and 50 to 70 percent by weight of water. If such material is used as a binder solution, additional water may be unnecessary in the ceramic sealing composition. Again the total amount of water is preferably no more than about 30 percent of the total weight of the ceramic composition. The amount of water is such that the silica sol forms a solid gel with adequate strength to hold the ceramic particles together, to adhere the ceramic strip to the metal, and to provide adequate sealing during the soldering operation. A typical ceramic composition using this type of filler would comprise 15 to 50 percent by weight of colloidal silica, 50 to 80 percent by weight of refractory particles and 5 to 30 percent by weight of water. Of course, other ingredients could also be added.

Good results are also obtained if the ceramic composition employs as the vehicle and binder an alkyl silicate solution of the type commonly used in the investment casting art. The binder solution may, for example, consist of 40 to 70 percent alcohol, 30 to 60 percent of ethyl silicate, 4 to 12 percent water and about 0.2 to about 0.6 percent by weight of concentrated hydrochloric acid and optionally a small amount of magnesia as disclosed, for example, in U.S. Patent No. 3,160,931. A suitable ceramic sealing composition could, for example, be prepared by mixing 100 parts by weight of powdered quartz or other refractory material with 25 to 30 parts of an ethyl silicate binder solution prepared by mixing, at room temperature, 51 percent isopropyl alcohol, 42 percent ethyl silicate grade 40 (40% $SiO_2$), 6.6 percent water and 0.4 percent concentrated hydrochloric acid. Optionally, about 1 percent of magnesia could be added to accelerate gelling and to neutralize the acid. Other commercial grades of ethyl silicate containing 30% to 40% $SiO_2$ could also be used and various other alkyl silicates could be employed as will be apparent to those skilled in the art. Also, larger amounts of water could be used.

The ceramic sealing composition of this invention is characterized as consisting essentially of finely divided ceramic particles and a gelling silicious binder, but it will be understood that such characterization does not exclude water or additional ingredients in amounts which do not change the essential nature of the composition. Thus, the composition may contain small amounts of conventional chemicals to modify or accelerate the formation of a solid silicious gel, minor amounts of solder glass which would serve as a binder as well as a refractory, small amounts of fillers such as wood particles, and small amounts of various other materials such as polyvinyl alcohol, polyvinyl acetate, boric acid, ammonium phosphate and various other thickeners or plasticizers. In order to improve the plasticity of the ceramic composition, materials can be used such as diglycol stearates, glycerine or other water-soluble compounds, kaolin, ball clays and the like. Substantial amounts of clay are desirable to provide the desired pasty consistency in the sealing composition.

Also, there may be employed substantial amounts of solder glass, which is a low melting glass of high lead content. While solder glass serves as a binder, it is preferable to operate without it because it provides poorer adhesion to metal and requires special preparation of the metal surfaces. It is best not to employ more than 30 percent by weight of glass in the sealing composition.

It will be understood that the materials used in the sealing composition, in addition to the vehicle or binder and the ceramic particles, should not interfere with the use of the soldering flux and should not decompose or give off so much gas when heated as to interfere with soldering. The same is true of the fibrous or comminuted ceramic materials used in the composition. The ingredients should be selected to provide excellent adhesion to metal, to form a strong solid gel, to provide an impervious sealant, and to remain effective when heated to 1000° to 1200° F. or higher during the soldering operation. Also, the composition should be initially prepared so that it can be applied as a narrow strip and will maintain its shape. It preferably has a pasty consistency so that it can be extruded by forcing it through a small opening as in a caulking gun. In the automobile factory it may be desirable to provide a guided nozzle or gun to apply a straight strip of the extruded ceramic composition to the bottom crack of the solder-receiving channel.

The sealing composition may be compounded to gel in the desired manner at room temperature or to harden properly when applied to a heated surface or heated by a torch after it is applied and before it has gelled. Good results can be obtained when the sealing composition is applied to the metal joint while the joint is at an elevated temperature such as 200° to 400° F. or at a moderate temperature such as 120° to 200° F. Heating is usually not necessary but can be used to speed up the evaporation of excess water or to speed up gellation. Because it is usually preferable in the factory to avoid delay and because it is desirable to heat the joint prior to application of the flux, the lapped joint of the auto body is heated to a high temperature, such as 300° to 400° F. either before or soon after applying the ceramic sealing strip according to this invention. The heating is continued so that the solder is applied to hot surfaces, for example at temperatures between 400° and 1000° F. and preferably somewhat above the melting point of the solder. Of course, welding torches or the like can be used to heat localized areas of the body panels and to melt the solder.

The following examples are intended to illustrate the invention but not to limit it.

EXAMPLE I

A ceramic sealing composition is prepared at room temperatures by mixing 8000 grams of Potter's flint (−200 +400 mesh) with 2550 cubic centimeters of a sodium silicate solution. The material is forced through a nozzle and applied as an extruded strip to a lapped welded joint as shown in FIGURE 4, for example, while the joint is heated to 150° F. The metal surfaces of the joint are then heated to a temperature of about 250° F. and a conventional acid flux is applied to the heated surfaces in the channel 7b, said flux being prepared by adding metallic zinc to hydrochloric acid. The joint $A^2$ is then heated to a temperature of 1000° to 1100° F. and filled with solder in the conventional manner, the solder being worked to provide an outer surface substantially flush with the adjacent outer surfaces of the two body panels. The outer surface is then sanded and painted to cover the joint. It is found that the sealing composition provides good adhesion of the ceramic material to the metal and effectively prevents leakage of the acid flux into the crack of the welded joint and that such joint is not subject to rapid corrosion as is the case when the same joint is fluxed and soldered without the sealing composition of this invention.

EXAMPLE II

A welded joint is covered with solder and painted after the crack thereof is covered with a ceramic sealing composition using the same procedure as in Example I but using a ceramic sealing composition having the following formula:

| | |
|---|---|
| Quartz (—200 mesh) grams | 8000 |
| Ball clay do | 2000 |
| Sodium silicate solution cc | 2200 |

The sealing composition adhered well to the metal and effectively prevented leakage of the acid flux, and a good soldered joint was obtained.

EXAMPLE III

A soldered joint was prepared using the procedure of Examples I and II but using a different ceramic sealing composition having the following formula:

| | |
|---|---|
| Quartz (—200 mesh) grams | 7240 |
| Ball clay do | 810 |
| Sodium silicate solution cc | 2150 |

Again there was good adhesion of the ceramic material to the metal and the ceramic material provided an effective seal.

EXAMPLE IV

A joint was prepared and soldered in accordance with the procedure of the above examples but using a ceramic sealing composition having the following formula:

| | |
|---|---|
| Quartz (—200 mesh) grams | 5380 |
| Ball clay do | 378 |
| Sodium silicate solution cc | 1660 |

Again the sealing composition was effective and bonded well to the metal.

EXAMPLE V

A lapped joint was covered with solder according to the procedure of the above examples but using a ceramic sealing composition having the following formula:

| | |
|---|---|
| Quartz (—200 mesh) grams | 12,000 |
| Kaolin do | 700 |
| Ball clay do | 700 |
| Sodium silicate solution cc | 3,750 |

The above composition is a solid material having a high enough plasticity so that it can easily be extruded to form a sealing strip. The composition is advantageous because of the high plasticity and also because of the low degree of foaming, and it bonds well to the metal surface so long as such surface is relatively clean and does not contain oil.

EXAMPLE VI

The procedure of the above examples was followed using a sealing composition having the following formula:

| | |
|---|---|
| Quartz (—200 mesh) grams | 918 |
| Kaolin do | 81 |
| Ball clay do | 81 |
| Sodium silicate solution cc | 1108 |

The above composition is a paint-like substance and will adhere to an oily metal surface when heated to a high temperature. It is advantageous to use this material when all of the oil has not been removed from the metal surfaces to which the composition is to be applied.

The sodium silicate solution used in each of Examples I to VI has a density of about 12.7 pounds per gallon and contains about 56.5 percent water and about 43.5 percent of sodium silicate ($Na_2O$, 1.9 $SiO_2$). Other sodium silicates or water glasses may also be used (i.e., mixtures of sodium disilicate and sodium tetrasilicate), the molar ratio of $SiO_2$ to $Na_2O$ being between 1.5 and 4. The amount of water in the sodium silicate solution is usually about 50 to 65% of the total weight of the silicate solution and sufficient to dissolve the sodium silicate. Because the alkali metal silicates are sold commercially in aqueous solutions, it is preferred that they are employed as such. The amount of water in the solution is not critical and can vary considerably.

In the above examples, various conventional ball clays may be employed including Bell Dresden ball clay and the like. The clays are added to improve the plasticity of the sealant and to reduce the foaming problem. Preferably the ceramic particles used in the sealing composition of this invention consist of about 80 to 90 percent refractory material and about 10 to 20 percent by weight of clay.

The process of this invention is suitable for repairing damaged automobile bodies as well as for manufacture of new automobile bodies. In repair work, the lapped joints of the panels which are originally joined with spot welds are often repaired by braze welding or brazing, using a brass or bronze filler rod and a brazing flux to clean the metal surfaces. Brazed joints, similar to the welded joints shown in the body panels of the drawings, may, of course, be covered with solder or other low melting alloy after using the ceramic crack sealer of this invention.

When making body repairs by hand, the procedures may be somewhat different than those commonly used at the automobile factory. A strong flux, such as metallic zinc dissolved in muriatic acid, is often more important because more paint, rust or other foreign material may have to be removed. Also, there may be many more depressions to be filled with solder. In covering a channel or depression formed by a conventional spot-welded or braze-welded seam, the ceramic sealing strip is applied and heated to seal the crack generally in the manner shown in the drawings, and then the flux or a timing compound (i.e., a mixture of flux and powdered solder) is applied to the heated metal to cover the entire area to be soldered. In body repair work, a tinning procedure may be employed within a thin layer of solder is applied after heating the metal above the melting point of the solder to cover the heated metal; and, if desired, the surface can be fluxed repeatedly during such tinning. After tinning, a conventional body solder may be applied to the heated metal which does not flow as readily as the solder used for tinning. These and other modifications of the basic procedure first described above will become apparent to those skilled in the art from this description.

It will also be apparent that the ceramic sealing composition of this invention can be used to provide a heat resistant crack sealer for metal parts other than those shown in the drawings. The sealer can be placed in various types of cracks or fissures in metal parts which art to be welded, brazed or soldered to prevent leakage of the flux and/or the molten metal. What is important is that the ceramic sealer remains effective during the heating for a long enough time to serve its purpose. The use of the sealer of this invention is practical for rather large cracks as well as small cracks because it is inexpensive and can be used in generous amounts where needed.

It will be understood that, in accordance with the provisions of the patent laws, variations and modifications of the specific compositions, processes and products disclosed herein may be made without departing from the spirit of the invention.

Having described our invention, we claim:

1. A process for joining steel body panels of automobile bodies of comprising rigidly connecting the side portions of the panels to form a lapped joint while maintaining the outer surfaces of the panels flush with each other and spaced apart to provide a long channel at the joint, applying to the bottom portion of the channel a narrow strip of a ceramic composition of pasty consistency containing a water-soluble silica-containing binder and finely divided ceramic material, causing the binder to gel and harden, heating the joint, filling the channel with solder after heating the joint to a temperature above the melting point of the solder to provide a solder strip having an outer surface flush with the outer surfaces of said panels, and covering said outer surfaces with paint to conceal said joint.

2. A process of forming sheet metal articles, such as vehicle bodies, comprising welding the side portions of two metal sheets together while holding the outer surfaces of the sheets substantially in alignment but having a depression at the joint between the sheets which leads to the weld, applying a flux to the exposed metal surfaces at said depression along the length of the joint, heating the exposed surfaces to soldering temperature, and thereafter filling the depression with solder, characterized in that there is applied to the bottom portion of the depression at the entrance to the weld along the length of the joint a flowable ceramic composition and the binder of said composition is gelled prior to application of said flux to seal said entrance and to bond the composition to said metal sheets, said ceramic composition comprising a major proportion by weight of finely divided ceramic material and a minor proportion by weight of a soluble binder material selected from the group consisting of alkyl silicates, alkali-metal silicates, colloidal silica, and mixtures thereof which gels to bind the ceramic particles.

3. A process according to claim 2 characterized in that said ceramic composition contains about 15 to 50 percent by weight of a sodium silicate.

4. A process according to claim 2 characterized in that the principal binder of said ceramic composition is ethyl silicate.

5. A process according to claim 2 characterized in that the principal binder of said ceramic composition is a colloidal silica.

6. In a process of forming sheet metal articles, such as vehicle bodies, wherein two metal sheets are overlapped and welded together adjacent the side edge of one sheet to form a seam at said side edge, a flux is applied to the seam at said side edge, and the edge is covered with solder after heating the seam, the improvement which comprises applying to said side edge at the entrance to the welded joint prior to application of said flux a narrow strip of a pasty ceramic composition containing a major porportion by weight of finely divided ceramic material and a minor proportion by weight of a binder selected from the group consisting of alkyl silicates, alkali-metal silicates, colloidal silica and mixtures thereof, and thereafter heating the strip to cause gellation thereof and seal said entrance before said flux is applied.

7. A process as defined in claim 6 wherein said ceramic composition consists essentially of water, a major proportion by weight of refractory particles, and 15 to 40% by weight of sodium silicate.

8. A process of covering a fissure in a closed welded metal joint comprising closing and partially filling the fissure by applying entirely within the fissure a narrow strip of a pasty ceramic composition containing 15 to 50 percent by weight of a gelling silicate binder and at least 40 percent by weight of finely divided ceramic material, said strip having a width and height less than the width and depth of said fissure, heating the strip to cause gellation of said composition, thereafter cleaning the exposed metal surfaces beyond the opposite sides of said strip, and covering said exposed surfaces and the entire outer surface of said strip with a filler material which adheres to said exposed surfaces.

9. A process of covering a seam of an automobile body having a first sheet metal panel with an offset side edge portion, a main portion and a straight shoulder between said main portion and said side edge portion, a second sheet metal panel with a side edge portion overlapping and rigidly connected to said offset portion to form a straight seam, the second panel having a smooth outer surface flush with the smooth outer surface of said main portion of the first panel and having a straight edge spaced from and parallel to said shoulder to provide a straight narrow channel at said seam with a depth at least equal to the thickness of said second panel, said process comprising the steps of heating said channel, applying to said straight edge of said second panel in the bottom portion of said channel a narrow extruded strip of a pasty aqueous ceramic composition containing principally finely divided ceramic material and about 15 to 50 percent by weight of a sodium silicate, said composition covering the crack between the overlapping side edge portions of said panels but having a width and height materially less than the width and depth of said channel, causing the sodium silicate to gel and harden by application of heat to seal the entrance to said crack and to bond the ceramic strip to the metal surfaces at the bottom of said channel, thereafter applying an acid flux to the heated channel, filling the channel with solder while heating it to a temperature of 400° to 1200° Fahrenheit, finishing the surface of the solder to provide a smooth outer surface flush with the adjacent outer surfaces of said panels, and painting said outer surfaces to conceal the seam.

10. A process as defined in claim 9 wherein about 10 to 20 percent of the total weight of said finely divided ceramic material is a member of the group consisting of kaolin, ball clay and mixtures thereof.

11. A process of covering a seam having a first sheet metal panel with an offset side edge portion, a main portion and a straight shoulder between said main portion and said side edge portion, a second sheet metal panel with a side edge portion overlapping and rigidly connected to said offset portion to form a straight seam, the second panel having a smooth outer surface flush with the outer surface of said main portion of the first panel and having a straight edge spaced from and parallel to said shoulder to provide a straight narrow channel at said seam with a depth at least equal to the thickness of said second panel, said process comprising the steps of applying to said straight edge of said second panel in the bottom portion of said channel a narrow strip of a ceramic composition consisting essentially of a major portion by weight of finely divided ceramic material and at least about 15 percent by weight of a sodium silicate binder, said composition covering the crack between the overlapping side edge portions of said panels but having a width and height materially less than the width and depth of said channel, causing the sodium silicate to gel and harden by application of heat to seal the entrance to said crack and to bond the ceramic strip to the metal surfaces at the bottom of said channel, filling the channel with solder, providing the solder with a smooth outer surface flush with the adjacent outer surfaces of said panels, and providing said outer surfaces with a paint coating to conceal the seam.

12. A process of covering a long narrow depression in a metal joint comprising partially filling the fissure by applying entirely within the fissure a narrow strip of a flowable ceramic composition containing a gelling binder, heating the strip to cause hardening of said composition, and covering the entire outer surface of said strip and the exposed metal surfaces of the depression beyond the opposite sides of said strip with a filler material which adheres to said exposed surfaces.

13. In a process of forming sheet metal articles wherein two metal sheets are overlapped and rigidly joined together to form a seam with a narrow depression extending the length of the seam and said depression is thereafter filled with solder, said depression increasing in width from the bottom to the top, the improvement which comprises partially filling the depression with an aqueous ceramic composition before applying the solder, said ceramic composition consisting essentially of 50 to 85 percent by weight of refractory particles, 15 to 40 percent by weight of sodium silicate, and up to 30 percent by weight of water, and heating the composition to gel said binder.

14. A process of forming a metal joint comprising overlapping and rigidly joining two metal sheets to form a narrow depression at the edge of one of said sheets, partially filling said depression with an aqueous ceramic composition, hardening said composition, and completing the filling of said depression by completely covering said ceramic composition with a filler.

References Cited

UNITED STATES PATENTS

| | | | |
|---|---|---|---|
| 2,063,671 | 12/1936 | Gilpin | 29—491 X |
| 2,362,505 | 11/1944 | Smith | 29—491 X |
| 2,623,148 | 12/1952 | Ronay. | |
| 2,743,515 | 5/1956 | Davis et al. | 29—491 |
| 2,796,843 | 6/1957 | Kleppinger | 29—491 X |
| 2,916,001 | 12/1959 | Cayle et al. | 29—491 |
| 3,138,863 | 6/1964 | Clark et al. | 29—491 X |

FOREIGN PATENTS 642,854  9/1950  Great Britain.

JOHN F. CAMPBELL, Primary Examiner

J. L. CLINE, Assistant Examiner

U.S. Cl. X.R.

29—191, 401